Sept. 15, 1959　　　　M. O. SHEETS　　　　2,903,836
TREATING ROLLS FOR COMBINE HEADER
Filed Nov. 8, 1956　　　　　　　　　　　2 Sheets-Sheet 1
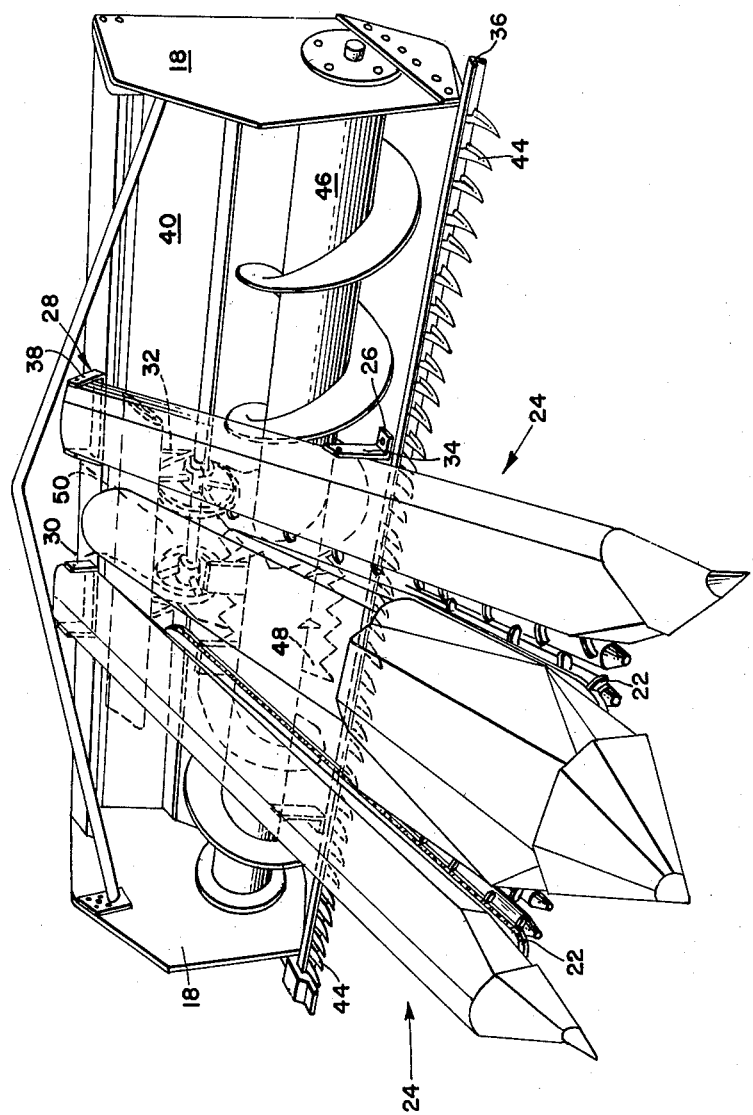
INVENTOR
MILTON O. SHEETS
BY *Cushman Darby & Cushman*
ATTORNEY Sept. 15, 1959      M. O. SHEETS      2,903,836
TREATING ROLLS FOR COMBINE HEADER
Filed Nov. 8, 1956      2 Sheets-Sheet 2
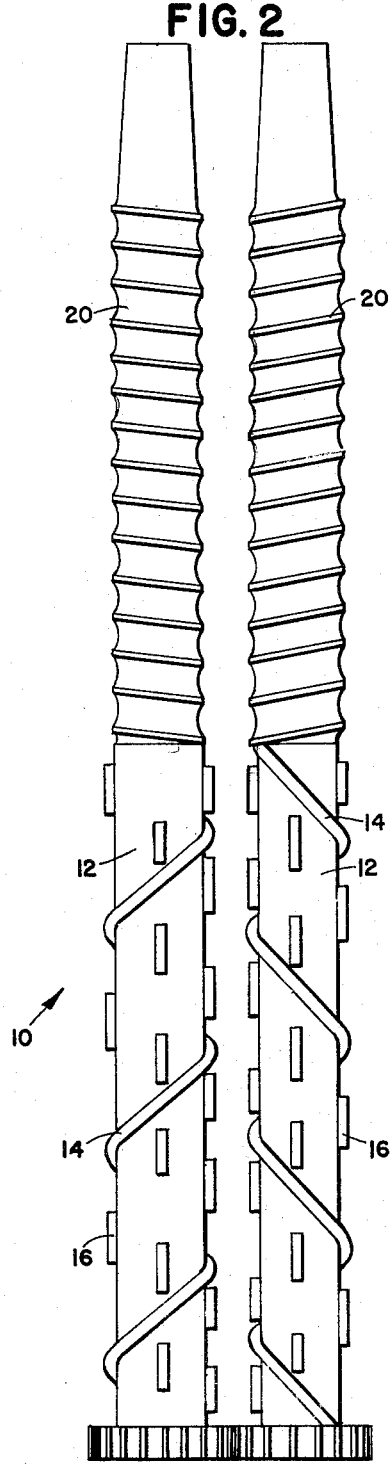
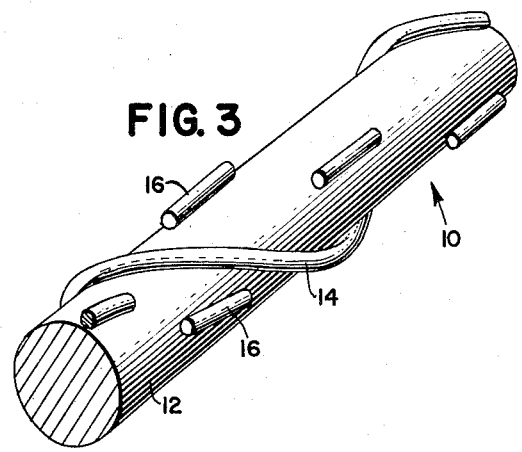
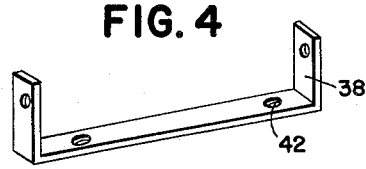
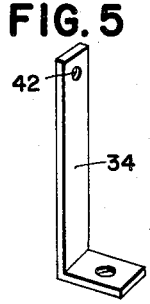
INVENTOR
MILTON O. SHEETS
BY *Cushman Darby & Cushman*
ATTORNEY United States Patent Office 2,903,836
Patented Sept. 15, 1959

2,903,836

TREATING ROLLS FOR COMBINE HEADER

Milton O. Sheets, St. Augustine, Ill.

Application November 8, 1956, Serial No. 621,118

1 Claim. (Cl. 56—104)

This invention relates to corn harvesters and more particularly to improved snapping and conveying rolls for use in corn harvesters and to improved means for collecting the picked corn.

In the past, corn harvesters have generally consisted of mere tractor attachments or separate draft vehicles adapted to be drawn by tractor in which the corn stalks were cut and conveyed rearwardly as the snapping rolls removed ears of corn therefrom. Some rolls were used to effectuate husking while the ears were conveyed rearwardly to suitable collecting means such as a wagon or the like. In certain instances, the stalks and cobs, in those instances where shelling was effected, were comminuted by the action of suitable cutting means. A serious drawback to the prior procedures was the loss of kernels of corn from the cob as it was being stripped and conveyed to the collection point. An additional disadvantage resided in the fact that the corn had to be later shelled and the cob disposed of by some means entirely distinct from the corn harvesting unit.

Therefore, one of the principal objects of the present invention is the provision of omnibus rolls which snap the ears of corn from the stalks, husk and shell the ears and comminute the cobs and stalks in a single operation.

Another object of the present invention is the provision of a harvesting combine whereby the corn and comminuted material are collected in a combine header and later separated by the combine.

Still another object of the present invention is the provision of an improved work roll which may be readily adapted to present-day corn harvester units.

Yet another object is the provision of an omnibus roll that is simple in construction and inexpensive to manufacture.

Other objects and advantages of the present invention will be in part obvious and in part explained by reference to the accompanying specification and drawings in which:

Figure 1 is a perspective view showing corn picking units, utilizing the improved rolls, mounted on a combine header;

Figure 2 is a top plan view of the improved omnibus rolls according to the invention;

Figure 3 is a fragmentary perspective view of the improved upper working rolls;

Figure 4 is a perspective view of the upper mounting plate; and

Figure 5 is a perspective view of the lower mounting plate.

Referring to Figure 3, the improved working rolls 10 which are used to replace different types of rolls on present-day harvesters comprise an elongated cylindrical body 12 having a spiral protuberance 14 extending throughout the length thereof and a plurality of short cylindrical protuberances 16 attached at spaced intervals also throughout the length of the body. The short cylindrical protuberances 16 are spaced between the spiral protuberance 14, the spiral protuberance not overlapping any short cylindrical protuberance. Therefore during rotation of the rolls the various protuberances will operate in meshed synchronism to strip, convey and comminute the cobs and stalks of corn. Preferably, the pair of cooperating rolls are disposed, as shown in Figure 2, in such a manner that the spiral protuberance 14 of each of the rolls 10 will enter the space between the aligned short cylindrical protuberances during rotation of the two rolls. The total effect of these rolls during the passage of stalks and ears of corn therethrough is the creation of a grinding or comminuting effect that breaks up the stalks and cobs and permits the entire mass to pass therethrough. That is, all of the comminuted parts of the plant, including the kernels, are passed through the rolls and fall into a suitably provided receptacle, in this case a grain combine header 18.

As previously suggested, the above-described rolls may be substituted on present-day corn harvesters, or if desired new harvesters can be constructed utilizing the improved rolls. As best seen by referring to Figure 2, the rolls 10 are secured to the upper end of the standard conveying and snapping rolls 20. Thus, the corn stalks, when cut, are conveyed by means of gathering chains 22 and led into the rolls 20 for the previously described operations.

With the rolls thus assembled, a multiplicity of operations may be effectually carried out by mounting the corn picker 24 upon the combine header 18, as shown in Figure 1. The corn picking units 24 are mounted to the header at points 26 and 28 and driven from sprocket 30 by chain 32 which is connected to suitable driving means (not shown). The lower mounting means comprises mounting plates 34 that are bolted to the header sickle bar 36. It will be seen that the sickle bar comprises an angle-shaped body which provides suitable mounting space for the lower plates 34. For mounting of the upper plates 38, the horizontally extending baffle plate 40 of the combine header has been chosen. Obviously the particular site used for mounting plates 34 and 38 can be varied to meet the different conditions of other types of headers. As will be noted by reference to Figures 4 and 5, the lower mounting plates 34 are generally L-shaped while the upper mounting plates 38 are generally U-shaped. All of the plates are provided with openings 42 for securement of the plates to the header 18 and to the corn pickers 24 by suitable fastening means, such as screws or the like. The mounting plates enable the picker units to be readily secured to the header 18 with a minimum amount of cost and difficulty as well as at the smallest expense. When the picking units are thus superposed upon the header unit, the outer teeth 44 of sickle bar 36 proceed to cut the corn stalks while gathering chains 22 and rolls 20 convey the stalks upwardly to the rolls 10. During the progression of the corn into the picking machine, the omnibus rolls, which comprise the combination of the standard type roll and the improved comminuting rolls, perform a plurality of operations, viz., husking, shelling and comminuting. It is to be pointed out that the corn is not husked in the manner of other corn pickers, but rather the entire ear and stalk are more or less crushed by the aforementioned spiral and cylindrical protuberances 14 and 16 respectively, leaving the stalk, as well as the cob, in such comminuted or particulate form that it will go through the combine in the same manner as the lighter grains while catching all the corn in the apron of the combine. By virtue of the combination of a corn picker with the improved rolls being used with a combine header, it is apparent that as the ears and stalks of corn are ground by the rolls, the particulate material will fall into the combine header where, by means of screw feed device 46, the mixed materials will be conveyed toward the center of the header and thereafter into the combine itself, the combine not being illustrated. Once the material has reached the center of the header it is conveyed rearwardly by the action of the paddle-like extension 48 through opening 50 which connects to the combine proper. Upon entry of the material into the combine, the dross material is separated from the grain by air blast or other suitable means common to combines.

As a supplemental feature, the comminuted stalk and cob may be spread upon the ground in as good a form as any of the present stalk choppers can produce, thus destroying the winter harbor of chinch bug while providing a good mulch. It is quite obvious that the present invention makes possible to the farmer an all purpose grain combine which is useful not only on the smaller stalked grains but is also valuable in harvesting the larger ones such as corn. Heretofore, such a result has not been achieved but rather additional machinery for working the corn has been required. The advent of the improved rolls has made possible this combination as well as permitting the construction of a picker which accomplishes a plurality of operations without additional choppers, etc.

It will thus be seen that there has been provided by this invention a structure in which the various objects hereinbefore set forth together with many practical advantages are successfully achieved. Many possible embodiments may be made of the mechanical features of the present invention without departing from the scope thereof, but it is to be understood that all matter hereinbefore set forth or shown in the accompanying drawings is to be interpreted as illustrative and not in a limiting sense.

I claim:

In combination with a corn harvesting unit having a combine header, a pair of longitudinally extending spaced parallel and transversely aligned omnibus rolls, each of said rolls having a lower snapping section and an upper crushing section, said lower section having a convoluted outer annular rib surface, said upper section having an outer surface provided with a spiral protuberance extending the length thereof and merging into the convoluted lower section, said upper section having spaced longitudinally extending short protuberances arranged in spiral rows, and rows of the spiral protuberances extending on opposite sides of said spiral protuberances, the protuberances of one roll being spaced from those of the other roll and co-acting to shell the corn kernels from the cobs and reduce the stalks and ears to a predigested mass in a single operation and prior to the comminuted material passing into the combine header.

References Cited in the file of this patent

UNITED STATES PATENTS

| | | |
|---|---|---|
| 2,333,901 | Swenson | Nov. 9, 1943 |
| 2,399,774 | Welty | May 7, 1946 |
| 2,469,687 | Fergason | May 10, 1949 |
| 2,501,097 | Rosenthal | Mar. 21, 1950 |
| 2,706,373 | Nisbet | Apr. 19, 1955 |
| 2,770,087 | Hurlbut | Nov. 13, 1956 |
| 2,821,058 | Jones | Jan. 28, 1958 |